United States Patent [19]
Charles et al.

[11] Patent Number: 4,959,262
[45] Date of Patent: Sep. 25, 1990

[54] ZINC OXIDE VARISTOR STRUCTURE

[75] Inventors: Richard J. Charles, Schenectady; Achuta R. Gaddipati, Scotia, both of N.Y.

[73] Assignee: General Electric Company, Schenectady, N.Y.

[21] Appl. No.: 238,791

[22] Filed: Aug. 31, 1988

[51] Int. Cl.5 .................................................. B32B 7/00
[52] U.S. Cl. .................................... 428/329; 428/432; 428/901; 338/20; 338/21; 156/89
[58] Field of Search ........................ 428/329, 432, 901; 338/20, 21; 156/89

[56] References Cited

U.S. PATENT DOCUMENTS

| | | | |
|---|---|---|---|
| 3,247,573 | 4/1966 | Noack | 29/599 |
| 3,333,333 | 8/1967 | Noack | 29/604 |
| 3,333,334 | 8/1967 | Kuliczkowski et al. | 29/604 |
| 3,909,327 | 9/1975 | Pechini | 156/89 |
| 3,988,498 | 10/1976 | Maher | 428/434 |
| 4,041,436 | 8/1977 | Kouchich et al. | 428/432 |
| 4,544,644 | 10/1985 | Yamashita et al. | 501/134 |
| 4,582,814 | 4/1986 | Thomas | 501/136 |
| 4,726,991 | 2/1988 | Hyatt et al. | 428/329 |
| 4,731,297 | 3/1988 | Takaya | 428/553 |
| 4,746,557 | 5/1988 | Sakamoto et al. | 428/138 |

*Primary Examiner*—Patrick Ryan
*Attorney, Agent, or Firm*—Jane M. Binkowski; James C. Davis, Jr.; James Magee, Jr.

[57] ABSTRACT

A varistor device comprised of a multi-layer zinc oxide varistor matrix containing metallizations of silver.

18 Claims, 3 Drawing Sheets

ZINC OXIDE VARISTOR STRUCTURE

The following copending patent applications assigned to the assignee hereof are incorporated herein by reference:

Ser. No. 172,834 filed on Mar. 25, 1988, for "Ferrite Composite Containing Silver Metallization" for R. J. Charles and A. R. Gaddipati discloses the production of a composite comprised of a sintered matrix of spinel ferrite and an electrically conductive phase of elemental silver by co-firing a laminated structure of ferrite powder-containing tapes containing a silver metallization-forming material having two end portions wherein only the end portions are exposed.

Ser. No. 197,371 filed on May 23, 1988, for "Ferrite Body Containing Metallization" for R. J. Charles and A. R. Gaddipati discloses the production of a composite comprised of a sintered matrix of spinel ferrite and a non-exposed continuous phase of elemental silver or Ag-Pd alloy ranging to 25 atomic % Pd by co-firing a laminated structure of ferrite powder-containing tapes containing non-exposed metallization-forming material. The composite can be formed into a composite product which contains a continuous silver or Ag-Pd alloy phase with two end portions wherein only the end portions are exposed.

This invention relates to the production of a multilayer varistor, i.e. non-linear or variable resistor, structure comprised of a zinc oxide varistor ceramic matrix containing electrically conductive metallizations of elemental silver. In one embodiment, the varistor structure, i.e. device, is comprised of a multi-layer varistor matrix and two electrodes comprised of silver.

In general, the current flowing between two spaced points is directly proportional to the potential difference between those points. For most known substances, current conduction therethrough is equal to the applied potential difference divided by a constant, which has been defined by Ohm's law to be its resistance. There are, however, a few substances which exhibit non-linear resistance. Metal oxide varistor devices utilize these substances and require resort to the following equation (1) to quantitatively relate current and voltage:

$$I = \left(\frac{V}{C}\right)^{\alpha} \quad (1)$$

where V is the voltage applied to the device, I is the current flowing through the device, C is a constant and $\alpha$ is an exponent greater than 1. Inasmuch as the value of $\alpha$ determines the degree of non-linearity exhibited by the device, it is generally desired that $\alpha$ be relatively high. $\alpha$ is calculated according to the following equation (2):

$$\alpha = \frac{\log_{10}(I_2/I_1)}{\log_{10}(V_2/V_1)} \quad (2)$$

where $V_1$ and $V_2$ are the device voltages at given currents $I_1$ and $I_2$, respectively.

At very low voltages and very high voltages metal oxide varistors deviate from the characteristics expressed by equation (1) and approach linear resistance characteristics. However, for a very broad useful voltage range the response of metal oxide varistors is as expressed by equation (1).

The values of C and $\alpha$ can be varied by changing the varistor formulation or the manufacturing process. Another useful varistor characteristic is the varistor voltage which can be defined as the voltage across the device when a given current is flowing through it. It is common to measure varistor voltage at a current of one milliampere and subsequent reference to varistor voltage shall be for voltage so measured.

Zinc oxide varistor materials are necessarily fired in an oxidizing atmosphere, usually air, within a temperature range of 1000° C. to 1300° C. to maintain the chemistry and the stability of the zinc oxide and other minor glassing oxides ($Bi_2O_3$, MnO, $Sb_2O_3$, etc.) during the sintering process and to develop the desired microstructure.

The present invention enables the formation of continuous metallizations of silver in a co-fired varistor body.

In one embodiment, this invention relates to the production of a composite comprised of at least a three-layer ceramic matrix containing at least two continuous separate metal phases, i.e. metallizations, of elemental silver wherein the metallizations are not exposed to the ambient. In another embodiment, the composite is modified to produce a varistor device comprised of a varistor matrix and two electrodes.

Those skilled in the art will gain a further and better understanding of the present invention from the detailed description set forth below, considered in conjunction with the Figures accompanying and forming a part of the specification, in which.

Figure 3:
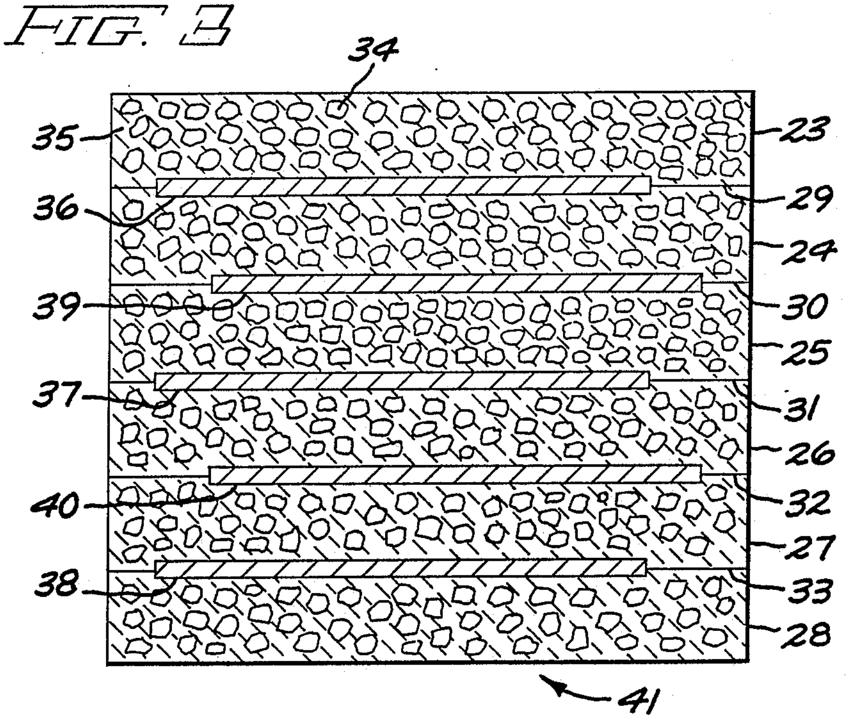
FIG. 3 shows the cross-section of another embodiment of the present sintered composite comprised of six ceramic layers totally enclosing three first metallizations and two second metallizations.
Figure 4:
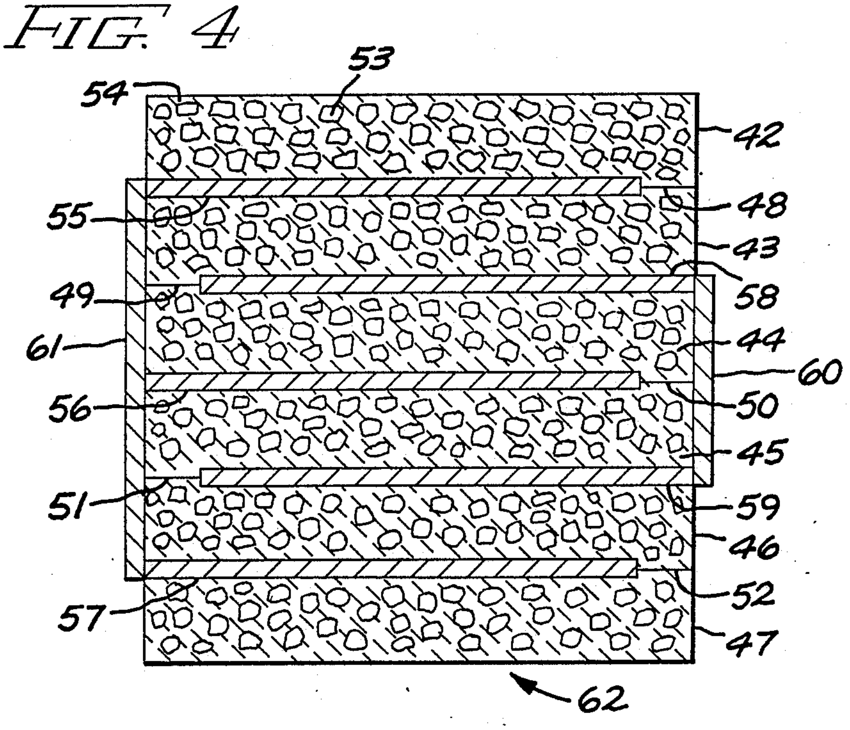
Figure 5:
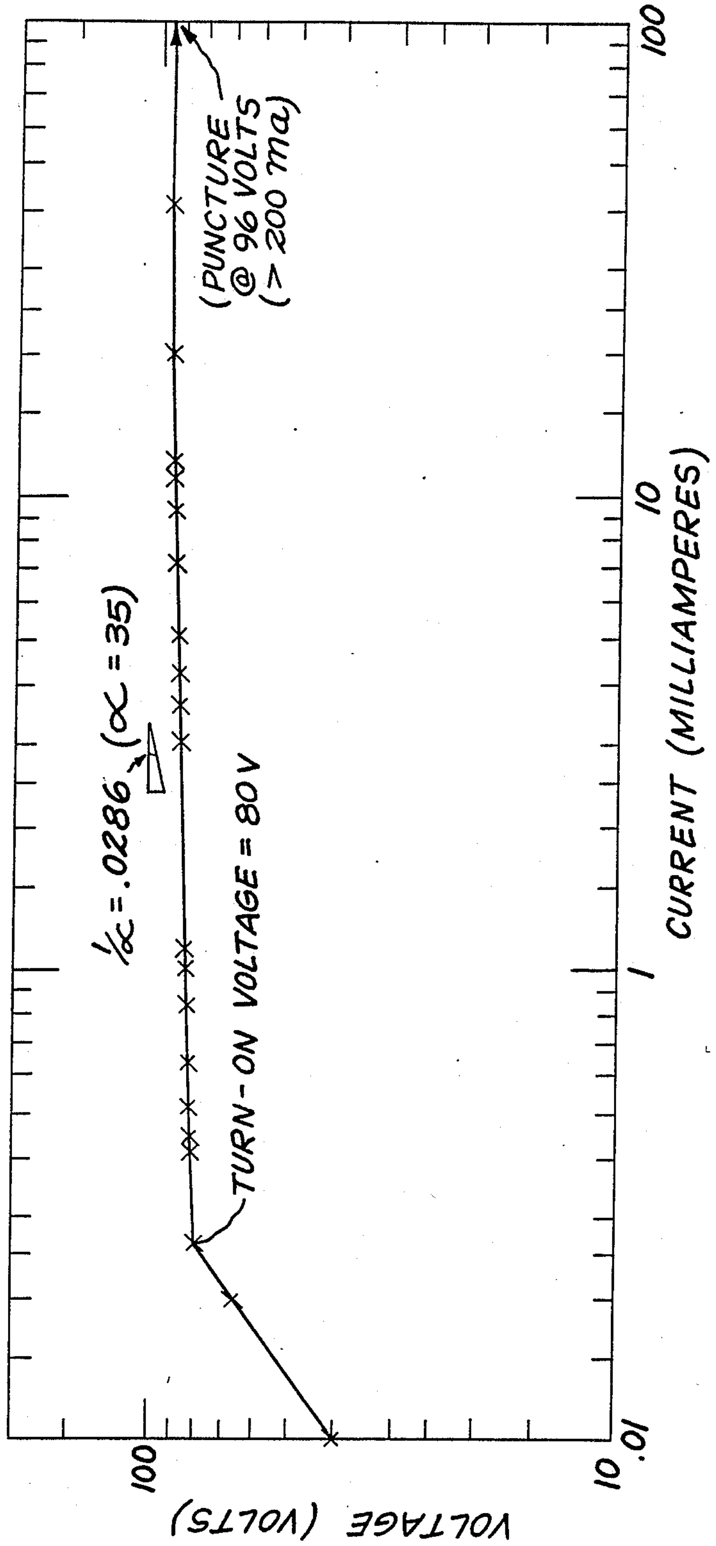

FIG. 4 shows the cross-section of the present varistor device formed by slicing off the sides of the composite of FIG. 3 and electrically connecting the exposed proximal end portions of three first metallizations forming a first electrode and electrically connecting the exposed end portions of two second metallizations forming a second electrode; and FIG. 5 is a graph where voltage is plotted against current which illustrates the non-linear properties of the present varistor device.

Generally, each metallization in the present sintered composite or varistor device has a proximal end portion and a distal end portion. By a proximal end portion of a metallization, it is meant herein that end portion which is closest to the edge of a matrix and opposite the distal end portion which is farthest away from an edge of a matrix. In the resulting varistor device, the proximal end portion of the metallization is exposed sufficiently for electrical contact, or it is electrically connected, whereas the distal end portion of the metallization terminates within the matrix.

The present sintered composite is comprised of a solid multi-layer self-supporting body comprised of a varistor ceramic matrix totally enveloping each of a plurality of metallizations comprised of at least a first and second metallization. The sintered matrix is comprised of at least three layers with each metallization being present only at substantially the region between two layers of matrix and being directly bonded to the matrix. The metallizations are continuous and separated from each other by at least substantially a layer of matrix. First and second metallizations are offset from each other at least sufficiently to form separate electrodes or parts thereof. At least one first and second metallization are overlapping, i.e. they extend over part of each other. More specifically, at least one first metallization passes through a region between two matrix layers which corresponds to a part of the region through which a second metallization passes. Part of each matrix layer forms an integrally bonded interface with another matrix layer, i.e. at least part of each matrix layer is directly bonded to another matrix layer.

Figure 1:
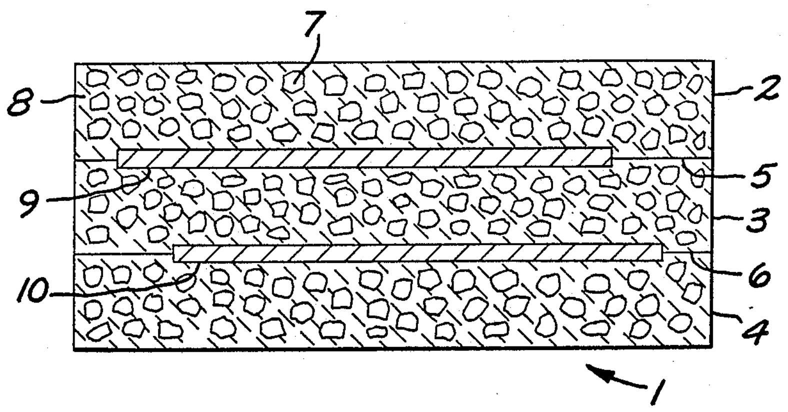
FIG. 1 shows the cross-section of one embodiment of the present sintered composite formed with three ceramic matrix layers totally enclosing a first and second metallization.

FIG. 1 illustrates one embodiment of the present composite 1 comprised of matrix layers 2, 3 and 4 which are integrally bonded to each other at interfaces 5 and 6. Each matrix layer is comprised of a plurality of zinc oxide grains 7 which are electrically insulated from each other by continuously interconnecting glassy phase 8. The matrix layers totally envelop continuous first and second metallizations 9 and 10, respectively, which are offset from each other by an angle of about 180°.

Figure 2:
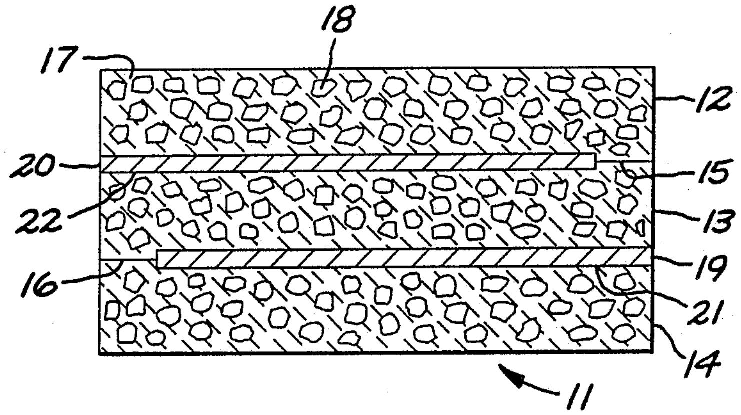
FIG. 2 shows the cross-section of the present varistor device formed by slicing off the sides of the sintered composite of FIG. 1 to expose the proximal end portions of metallizations sufficiently for electrical contact.

FIG. 2 illustrates the varistor device 11 formed from the composite of FIG. 1. Ceramic matrix layers 12, 13 and 14 are integrally bonded, i.e. bonded by sintering, at interfaces 15 and 16. The matrix layers are comprised of zinc oxide grains 18 electrically isolated from each other by glassy phase 17. First metallization 22 has exposed proximal end portion 20 for electrical contact and second metallization 21 has exposed proximal end portion 19 for electrical contact.

FIG. 3 illustrates another embodiment of the present composite 41 comprised of matrix layers 23, 24, 25, 26, 27 and 28 which are integrally bonded to each other at interfaces 29, 30, 31, 32 and 33. The matrix layers are comprised of a plurality of zinc oxide grains 34 which are electrically insulated from each other by glassy phase 35. The matrix layers totally envelop a set of first metallizations 36, 37 and 38 and a set of second metallizations 39 and 40.

FIG. 4 illustrates the cross-section of a varistor device 62 formed from the composite of FIG. 3. Matrix layers 42, 43, 44, 45, 46 and 47 are integrally bonded to each other at interfaces 48, 49, 50, 51 and 52. The matrix layers are comprised of a plurality of zinc oxides grains 53 electrically insulated from each other by glassy phase 54. First metallizations 55, 56 and 57 are electrically connected to each other by metallic contact 61 forming a first electrode and second metallizations 58 and 59 are electrically connected to each other by metallic contact 60 forming a second electrode. First metallizations 55, 56 and 57 are substantially parallel to each other and second metallizations 58 and 59 are substantially parallel to each other. First metallizations 55, 56 and 57 are disposed at an angle of about 180 degrees to second metallizations 58 and 59 and overlap therewith.

Briefly stated, the present process for producing a sintered composite comprised of at least a three-layer varistor matrix of zinc oxide grains isolated from each other by continuous glassy phase wherein said matrix totally envelops each of at least a first and second continuous metallization of elemental silver, said metallizations being spaced from each other and having a configuration enabling said composite to be useful for forming a varistor device, comprises:

(a) providing a varistor-forming powder comprised of a mixture of zinc oxide and glassy phase-forming additive;
(b) admixing said varistor-forming powder with an organic binding material;
(c) forming the resulting mixture into tape;
(d) providing a silver metallization-forming material;
(e) forming a layered structure of at least three of said tapes containing said metallization-forming material therewithin between said layers, said metallization-forming material being present in an amount sufficient to produce said metallizations;
(f) laminating the layered structure producing a laminated structure wherein none of said metallization-forming material is exposed;
(g) firing said laminated structure to thermally decompose its organic component at an elevated temperature below about 600° C. leaving no significant deleterious residue in the resulting fired structure, said firing being carried out in an atmosphere or vacuum which has no significant deleterious effect on said composite;
(h) sintering the resulting fired structure at a temperature ranging from about 1000° C. to about 1400° C. in an oxygen-containing atmosphere to produce a sintered product having the composition of said composite, said fired structure having a sufficient open volume available to accommodate the silver during sintering; and
(i) cooling said sintered product to produce said composite, said sintering and cooling being carried out in an atmosphere which has no significant deleterious effect on said composite.

In carrying out the present process, a varistor-forming powder is provided which is a mixture of powders comprised of a sufficient amount of zinc oxide and glassy phase-forming additive to form the present sintered matrix of desired composition. The particular composition of the starting powder mixture is known in the art. It depends largely on the electrical resistivity and non-linearity desired in the resulting varistor device and is determined empirically.

Generally, the starting powder mixture is comprised of from about 80.0 to 99.9 mole %, preferably about 94.0 to 99.8 mole %, of zinc oxide, about 0.05 to 10.0 mole %, preferably about 0.1 to about 1.0 mole %, of bismuth oxide and about 0.05 to about 10.0 mole %, preferably about 0.1 to 5.0 mole %, in total, of a member selected from the group consisting of aluminum oxide, antimony oxide, barium oxide, boron oxide, chromium oxide, cobalt oxide, indium oxide, iron oxide, manganese oxide, molybdenum oxide, nickel oxide, tantalum oxide, tin oxide, titanium oxide and a combination thereof.

In one embodiment, the starting powder mixture is comprised of from about 85.00 to 99.85 mole % of zinc oxide, 0.05 to 5.0 mole % of bismuth oxide, 0.05 to 5.0 mole % of cobalt oxide or manganese oxide and 0.05 to 10.0 mole % of, in total, a member selected from the group consisting of boron oxide, barium oxide, indium oxide, antimony oxide, titanium oxide, chromium oxide and a combination thereof.

In another embodiment, the starting powder mixture is comprised of zinc oxide and from about 0.1 to 10 mole %, preferably from about 0.2 to 1.0 mole %, of bismuth oxide.

The matrix-forming powder is a sinterable powder. Its particle size can vary. Generally, it has a specific surface area ranging from about 0.2 to about 10 meters$^2$ per gram, and frequently, ranging from about 2 to about 4 meters$^2$ per gram, according to BET surface area measurement.

The organic binding material used in the present process bonds the particles together and enables formation of the required thin tape of desired solids content, i.e. content of matrix-forming powder. The organic binding material thermally decomposes at an elevated temperature ranging to below about 600° C., generally from about 100° C. to about 300° C., to gaseous product of decomposition which vaporizes away leaving no residue, or no significant deleterious residue.

The organic binding material is a thermoplastic material with a composition which can vary widely and which is well known in the art or can be determined empirically. Besides an organic polymeric binder it can include an organic plasticizer therefor to impart flexibility. The amount of plasticizer can vary widely depending largely on the particular binder used and the flexibility desired, but typically, it ranges up to about 50% by weight of the total organic content. Preferably the organic binding material is soluble in a volatile solvent.

Representative of useful organic binders are polyvinyl acetates, polyamides, polyvinyl acrylates, polymethacrylates, polyvinyl alcohols, polyvinyl butyrals, and polystyrenes. The useful molecular weight of the binder is known in the art or can be determined empirically. Ordinarily, the organic binder has an average molecular weight at least sufficient to make it retain its shape at room temperature and generally such an average molecular weight ranges from about 20,000 to about 200,000, frequently from about 30,000 to about 100,000.

Representative of useful plasticizers are dioctyl phthalate, dibutyl phthalate, diisodecyl glutarate, polyethylene glycol and glycerol trioleate.

In carrying out the present process, the matrix-forming powder and organic binding material are admixed to form a uniform or at least a significantly or substantially uniform mixture or suspension which is formed into a tape of desired thickness and solids content. A number of conventional techniques can be used to form the mixture and resulting green tape. Generally, the components are milled in an organic liquid or solvent in which the organic material is soluble or at least partially soluble to produce a castable mixture or suspension. Examples of suitable solvents are methyl ethyl ketone, toluene and alcohol. The mixture or suspension is then cast into a tape of desired thickness in a conventional manner, usually by doctor blading which is a controlled spreading of the mixture or suspension on a carrier from which the tape can be easily released such as Teflon, Mylar or silicone coated Mylar or glass. The cast tape is dried to evaporate the solvent therefrom to produce the present tape which is then removed from the carrier.

The particular amount of organic binding material used in forming the mixture is determinable empirically and depends largely on the amount and distribution of solids desired in the resulting tape. Generally, the organic binding material ranges from about 25% by volume to about 50% by volume of the solids content of the tape.

The present tape or sheet can be as long and as wide as desired, and generally it is of uniform or at least significantly or substantially uniform thickness. Its thickness depends largely on the particular varistor device to be produced. Generally, the tape has a thickness ranging from about 25 microns to about 1000 microns, frequently ranging from about 50 microns to about 900 microns, and more frequently ranging from about 100 microns to about 800 microns.

The metallization-forming material can be any material containing or comprised of elemental silver which forms the desired continuous metallization of elemental silver in the present composite. The metallization-forming material comprised of elemental silver can be in a number of physical forms such as particulates, or a solid body such as a strip, wire, sheet or punched sheet.

The metallization-forming material containing elemental silver usually is deposited from a suspension, for example, a paste or ink, of particles of silver suspended in organic binder. The suspension is deposited, usually by screen printing, on the face of a tape and, when dry, produces the desired form of deposited metallization-forming material. Such suspensions are known and are available commercially, and preferably, they are free of glass frit. Generally, the metal particle ranges in size from about 0.1 micron to about 20 microns. Any organic component of the metallization-forming material thermally decomposes at a temperature below about 600° C. leaving no residue or no significant deleterious residue.

The shape of the deposited metallization-forming material can vary depending on the shape of the metallization desired in the resulting varistor device. Generally, it is in a shape which produces a metallization that covers the maximum area possible between two matrix layers in the resulting composite or varistor device. Preferably, it is in the shape of a sheet.

A layered structure of at least three of the tapes is formed which contains the metallization-forming material therewithin in the configuration desired in the composite or varistor device. The number of tapes used can vary widely depending largely on the particular varistor device desired. Generally, the layered structure is comprised of more than three tapes, frequently more than ten tapes, or more than fifty tapes. The layered structure can vary in arrangement and can be produced by a number of conventional techniques. Preferably, the tapes are substantially coextensive with each other, i.e. forming a sandwich-type structure. For example, the metallization-forming material can be deposited on a face of a plurality of tapes which then can be stacked together, generally one on top of the other, and the stack topped off with a blank tape. The configuration of the layered structure should permit the formation of the present laminated structure wherein none of the metallization-forming material is exposed to the ambient. Also, the configuration of the metallization-forming material in the layered structure should permit the production of the varistor device.

The layered structure is then laminated under a pressure and temperature determinable empirically depending largely on the particular composition of the organic binding material to form a laminated structure. Lamination can be carried out in a conventional manner. Laminating temperature should be below the temperature at which there is decomposition, or significant decomposition, of organic binding material and generally, an elevated temperature below 150° C. is useful and there is no significant advantage in using higher temperatures. Typically, the lamination temperature ranges from about 35° C. to about 95° C. and the pressure ranges from about 500 psi to about 3000 psi. Generally, lamination time ranges from about ½ to about 5 minutes. Also, generally, lamination is carried out in air.

In the laminated structure, none of the metallization-forming material is exposed to the ambient.

The metallization-forming material should be present in the laminated structure, i.e. the unsintered structure, in an amount at least sufficient to produce the desired continuous metallizations in the sintered composite. The amount of metallization-forming material can vary with the particular amount depending largely on the desired shape and thickness of the metallization in the sintered composite or varistor device. Such amounts are determined empirically.

Generally, the laminated structure is plastic, pliable or moldable and it can be arranged or shaped by a number of conventional techniques into a desired simple, hollow and/or complex form which is retained after sintering. For example, the laminated structure can be wound around into a coil in a single plane, or into a spiral form in a plurality of planes.

The laminated structure is fired and sintered to produce the present composite. At a temperature of less than about 600° C., thermal decomposition of organic material is completed producing a fired porous structure. Thermal decomposition can be carried out in any atmosphere, generally at about or below atmospheric pressure, which has no significant deleterious effect on the sample such as, for example, air. If desired, thermal decomposition may be carried out in a partial vacuum to aid in removal of gases.

The fired structure should have an open volume available to accommodate the silver during sintering of the varistor matrix. Specifically, during sintering, the matrix-forming powder densifies, i.e. it shrinks in volume, and the silver is totally molten. Since the silver is located within the structure, it cannot evaporate to any significant extent. Since silver cannot shrink, it must have an open volume to squeeze into during sintering. The open accommodating volume should be sufficient to prevent bloating of the sintered composite and is determinable empirically. Generally, the open accommodating volume which should be made available to the metal prior to sintering of the varistor matrix ranges from about 30% to about 60% by volume of the total volume of silver. Preferably, the open accommodating volume is about 50% in excess of the total volume of silver. Also, preferably, no amount or no significant amount of the accommodating open volume remains in the sintered composite.

Sufficient open accommodating volume can be made available to the silver before sintering occurs by a number of techniques. It can be produced in the layered or laminated structures or in the fired structure. The open accommodating volume is directly connected with the silver prior to sintering but it may be located only at a portion of the metallization-forming material, or along a boundary thereof, or it can be distributed in or dispersed through the metallization-forming material. For example, when the metallization-forming material is totally solid, such as a wire with two end portions, the accommodating volume can be comprised of a depression in the supporting tape open to each end portion.

Preferably, the accommodating volume is produced in the fired structure by depositing the metallization-forming material on the tape from a suspension of particles of elemental silver such as by screen printing. Typically, the silver particles occupy only about 50%–60% by volume of the dried and laminated screen printed material with the remainder being organic material or residual porosity. The organic material thermally decomposes before sintering occurs and such decomposition automatically produces an open accommodating volume in the fired structure substantially distributed in the metallization-forming material of about 50% in excess of the total volume of silver which frequently is the required open accommodating volume.

The shape of the deposited metallization-forming material in the unsintered laminated structure can vary and depends largely on the shape of the metallization desired in the sintered composite or varistor device. Generally, it is in the shape of a sheet or tape. The arrangement and shape of the metallization-forming material in the unsintered laminated structure should form metallizations in the sintered composite which permit it to be useful for producing the present varistor device.

The fired structure is sintered at a temperature ranging from about 1000° C. to about 1400° C., frequently from about 1100° C. to about 1300° C., depending largely on its composition and the particular composite desired. A temperature below about 1000° C. generally is not operable to produce the present composite. A temperature higher than about 1400° C. provides no advantage and may not produce the present composite.

Sintering is carried out in an oxygen-containing atmosphere which generally ranges in oxygen content from about 10% by volume, preferably from about 20% by volume, to about 100% by volume, of the atmosphere. Any residual gases present in the sintering atmosphere should be inert or substantially inert in the present process. Generally, the residual gases are selected from the group consisting of nitrogen, a noble gas such as argon, and a combination thereof. Preferably, the sintering atmosphere is air. Generally, upon completion of sintering, the sintered product is cooled in the same atmosphere used for sintering. The sintering and cooling atmospheres should have no significant deleterious effect on the present composite. Generally, the sintering and cooling atmospheres are at about atmospheric or ambient pressure, and generally the sintered product is cooled to about room temperature, i.e. from about 20° C. to 30° C.

Generally, sintering can be controlled in a conventional manner, i.e. by shortening sintering time and/or lowering sintering temperature, to produce a sintered matrix having a desired density or grain size. Usually, the longer the sintering time or the higher the sintering temperature, the more dense, i.e. less porous, is the matrix and the larger are the zinc oxide grains. Sintering time may vary widely and is determinable empirically. Generally, it ranges from about 5 minutes to about 5 hours.

The lower the porosity of the sintered matrix, sintered composite, or varistor device, the better are the electrical properties of the varistor device. Ordinarily, when present, porosity is located in the sintered matrix. Preferably, any porosity in the sintered matrix, sintered composite or varistor device is distributed therein, preferably significantly or substantially uniformly. Generally, pores in the sintered matrix range in size from about 1 micron to about 100 microns, frequently from about 10 microns to about 70 microns. The pores may be closed and/or interconnecting.

The present sintered matrix, composite or varistor device has a porosity ranging from about 0%, or about theoretical density, to less than about 10% by volume of the sintered matrix, or composite or varistor device. Preferably, the sintered matrix, composite or varistor device has a porosity of less than about 5%, or less than about 2%, or less than about 1% by volume of the sintered matrix or sintered composite or varistor device.

The present sintered composite is comprised of a sintered varistor matrix totally surrounding, i.e. enveloping, each of a plurality of continuous metallizations of elemental silver. The sintered matrix is in direct contact, i.e. it forms a direct bond, with each metallization. The sintered composite has at least a first and second metallization, and preferably it has a plurality of such metallizations. Generally, each metallization has two end portions, and preferably it is in the shape of a sheet or tape. The presence of the metallization in the composite can be determined by x-ray.

The present sintered matrix is comprised of at least three layers with the particular number of layers and the thickness of each layer depending largely on the particular varistor device desired. Generally, the matrix is comprised of more than three layers, frequently more than 10 layers, or more than 20 layers. In one embodiment, it ranges from 3 layers to 100 layers. Generally, the sintered matrix layer ranges in thickness from about 30 microns to about 1000 microns, or from about 50 microns to about 750 microns. Part of each matrix layer is directly bonded to another matrix layer forming an interface therewith. The length of such interface depends largely on the particular varistor device desired and should be at least sufficient to prevent a short circuit therein.

The present sintered matrix is comprised of zinc oxide grains electrically isolated from each other by glassy phase. The particular composition of the matrix depends largely on the electrical properties desired in the varistor device and is determined empirically. Generally, the zinc oxide grains ranges from about 80 mole % to about 99.9 mole %, frequently from about 94 mole % to about 99.8 mole %, of the sintered matrix composition. For most applications, the zinc oxide grains range from about 95 mole % to about 98 mole % of the sintered matrix.

The average grain size of the zinc oxide grains depends largely on the particular electrical properties desired in the varistor device and is determined empirically. Generally, the size of the zinc oxide grains is limited by the thickness of the starting tape, i.e. the tape used to form the layered structure before lamination. Generally, the zinc oxide grains do not grow any thicker than the sintered matrix layer in which they are contained. Generally, the zinc oxide has an average grain size ranging from about 10 microns to about 1000 microns, or from about 20 microns to about 750 microns. For most applications, the zinc oxide grains have an average size ranging from about 20 microns to about 25 microns. Preferably, the zinc oxide grains in the sintered matrix are of significantly or substantially uniform size.

Preferably, the zinc oxide grains are distributed in each sintered matrix layer. Preferably, the zinc oxide grains are distributed significantly or substantially uniformly through each sintered matrix layer. Each sintered matrix layer should contain at least one, and preferably at least three, zinc oxide grains which are electrically isolated from each other.

Generally, more than about 95% by volume, or more than about 98% by volume, or more than about 99% by volume, or about 100% by volume, of the total volume of zinc oxide grains are electrically isolated from each other by glassy phase.

The glassy phase totally coats, i.e. encapsulates, each zinc oxide grain. The thickness or amount of intergranular glassy phase should be at least sufficient to electrically isolate the zinc oxide grains from each other.

Generally, the mole fraction of zinc oxide phase in the sintered matrix is not significantly different from the mole fraction of zinc oxide powder in the starting varistor-forming powder.

Generally, the composition of the glassy phase in the sintered matrix differs from that of the additives in the starting varistor-forming powder in that it usually contains a small but detectable amount of zinc. The zinc is detectable by conventional techniques such as wet chemical analysis. Generally, zinc in the glassy phase may range up to about 0.05% by volume of the glassy phase. Generally, the mole fraction of glassy phase is not significantly different from that of glassy phase-forming additive in the starting varistor-forming powder mixture.

In the present sintered matrix, the zinc oxide grains comprise a crystalline phase and the glassy phase is amorphous. It is well known in the art that there also may be present a minor amount, usually up to about 0.05% by volume of the matrix, of some other crystalline phase which may form by reaction of the zinc oxide and glassy phase-forming additive.

The sintered composite contains at least a first and second metallization of silver, and preferably it contains a plurality of such metallizations. The metallizations are electrically conductive and spaced from each other, i.e. electrically insulated from each other within the sintered matrix, by at least substantially a layer of matrix. Generally, the first metallizations are parallel or substantially parallel to each other, and the second metallizations are parallel or substantially parallel to each other. Preferably, each first and second metallization overlap the other, i.e. each is interleaved with the other. Also, preferably, the first and second metallizations are parallel or substantially parallel to each other.

A first metallization is offset in direction from a second metallization in an amount at least sufficient to prevent a short circuit in the varistor device. The extent to which a first metallization differs in direction from a second metallization depends largely on the particular varistor device desired. Generally, a first metallization is disposed at an angle to that of a second metallization of at least about 5 degrees ranging to a maximum of about 180 degrees, at which point the first and second metallization are disposed in opposite directions.

The thickness of the metallization in the sintered composite or varistor device can vary depending largely on the electrical properties desired in the varistor device. Generally, the metallization thickness ranges from about 2 to about 800 microns, frequently from about 20 to about 150 microns.

The present invention enables the direct production of a sintered composite of desired shape and size. The sintered composite is rigid, self-supporting and free of bloating.

The present sintered composite is useful for producing a varistor device.

A number of techniques can be used to produce the varistor device. In one embodiment, where the sintered composite contains only a first and second metallization, at least a portion of the matrix can be removed to produce an exposed proximal end portion of each metallization sufficiently for electrical contact therewith thereby resulting in the present varistor device.

In a preferred embodiment for producing the varistor device, the sintered composite contains a plurality of first and second metallizations and at least a portion of the matrix is removed to produce exposed proximal end portions of the metallizations sufficiently for electrical contact therewith. The exposed end portions of all first metallizations are electrically connected thereby producing a first electrode, and the exposed end portions of all second metallizations are electrically connected thereby producing a second electrode.

A number of conventional techniques can be used to produce exposed proximal end portions of the metallizations. For example, the matrix can be removed by polishing it off. If desired, the sintered composite can be cut or sliced, for example by means of a diamond saw.

A number of conventional techniques can be used to electrically connect the exposed end portions of a plurality of metallizations to form an electrode. For example, a conventional metal solder can be deposited thereon in a known manner. Generally, the solder requires some firing usually in air to form the electrical connection. Preferably, silver paint is applied to electrically connect the exposed end portions of the metallizations. Such silver paints are commercially available and generally are comprised of a dispersion of silver particles in a volatile liquid medium. The deposited silver paint may form the electrical connection on drying in air at room temperature, or may require firing in air generally below about 200° C. If desired, lead wires can be attached to the electrodes in a conventional manner such as, for example, by using conventional solder.

The present varistor device has a number of uses. It is useful in electrical circuits as a voltage limiting device to protect succeeding electrical and electronic components from transient voltage surges. It is further useful, in conjunction with electrical measurement devices (meters, oscilloscopes, etc.), as a detector for determining the presence and the characteristics of transient voltage surges.

The invention is further illustrated by the following examples wherein the procedure was as follows unless otherwise stated:

An air furnace with molybdenum disilicide heaters was used.

The firing, sintering and cooling was carried out in air at about atmospheric pressure.

The varistor-forming powder was a sinterable powder.

The organic binding material used to form the tape was comprised of commercially available organic binder comprised of polyvinylbutyral (average molecular weight of about 32,000) and commercially available liquid plasticizer comprised of polyunsaturated hydroxylated low-molecular weight organic polymers. Specifically, the organic binding material was comprised of 4.13 grams of polyvinylbutyral and 1.48 grams of liquid plasticizer per 100 grams of varistor-forming powder.

The screen printing ink was a commercially available silver printing ink comprised of a suspension of silver particles in a solution of organic binder. About 50% by volume of the dried screen printed material was comprised of silver particles with the remainder being organic material.

In Examples 4 and 5 there also was used a commercially available ink comprised of Ag/30 atomic % Pd alloy particles in a solution of organic binder and about 50% by volume of the dried screen printed material was comprised of AgPd alloy particles with the remainder being organic material.

In the laminated structure, none of the silver or AgPd alloy was exposed to the ambient.

Standard techniques were used to characterize the composite or varistor device for density, microstructure and electrical properties.

EXAMPLE 1

A mixture of powder comprised of 97 mole % ZnO, 1 mole % $Sb_2O_3$ and 0.5 mole % each of $Bi_2O_3$, CaO, MnO and $Cr_2O_3$ with a specific surface area of about 1 $m^2/g$ was used as the varistor matrix-forming powder.

Tapes were prepared by the tape casting technique. 5.61 grams of the organic binding material were dissolved at ambient temperature in 50 grams of a mixture of 33 grams of toluene and 17 grams of methyl alcohol. The resulting solution was admixed with 100 grams of powder mixture in a ball mill for about 4 hours at room temperature. The resulting slurry was tape cast on a Mylar sheet using a doctor blade, then dried in air at room temperature and atmospheric pressure to remove the solvent, and the resulting tape was stripped from the Mylar sheet.

The tape had a substantially uniform thickness of about two mils with the varistor matrix-forming powder distributed therein substantially uniformly comprising about 52% by volume of the tape.

Each tape was cut into blanks about 1.5 inch square.

A pattern was screen printed with silver ink on a face of a blank which was in the shape of a split circle with two, parallel extending legs (a Greek letter Omega shape). The outside diameter of the circle was about $\frac{7}{8}$ in., the leg lengths were about $\frac{1}{4}$ in., and the trace width of the screen printing was about 3/16 in. The screen printing was dried in air at room temperature and when dried was about 0.75 mil thick.

The printed blank was disposed between three underlying and three overlying blanks covering the pattern and forming essentially a sandwich structure. This structure was laminated in air in a laminating press at about 93° C. under a pressure of about 800 psi for about $\frac{1}{2}$ minute. No portion of the pattern in the resulting laminated structure was exposed.

The laminated structure was placed in an open alumina boat and fired in air. The temperature was raised at a rate of about 150° C. per hour to thermally decompose and vaporize away the organic component below 600° C. The temperature was then raised at a rate of about 170° C. per hour to about 1100° C. where it was maintained for 1 hour. The sintered body was then furnace-cooled to room temperature.

The resulting composite was comprised of a varistor matrix which totally enveloped a metallization of elemental silver. The composite was self-supporting and free of bloating.

X-ray of the sintered composite shoWed that the original shape of the metallization was fully retained and uniformly reduced in planar dimensions by a linear 16% which corresponded to the overall 16% linear shrinkage of the matrix ZnO varistor material. Also, the two matrix layers were directly bonded to each other in the area not occupied by metallization.

Sectioning and optical examination of the sintered composite across the legs of the metallization showed that the thickness of the metallization was reduced to about 0.4 mil (~10 microns) and was dense silver, uniform in thickness and flatness and well bonded to the underlying and overlying matrix layers. The zinc oxide grains had an average size of about 5–10 microns and were contained within each matrix layer which had a thickness of about 100 microns. An intergranular continuous glassy phase encapsulated the zinc oxide grains isolating them from each other. The sintered matrix had a porosity of about 5 volume %. No porosity was detectable between the matrix and the metallization. Electrical continuity between the two legs was measured to be less than 0.1 ohms showing that the silver pattern was continuous.

From other work it was known that the varistor matrix had a composition which was the same as, or did not differ significantly from, that of the starting varistor-forming powder mixture.

This example illustrates that co-firing of zinc oxide varistor material in highly oxidizing atmospheres by multi-layer ceramic procedures using only silver metallization is effective and practical.

EXAMPLE 2

Tape was produced substantially as disclosed in Example 1, except that it had a thickness of about 10 mils.

The tape was cut into rectangular blanks about 5 cm×6 cm.

A rectangular pattern in the shape of a sheet of about 3 cm×4 cm was screen printed with silver screen printing ink. A screen mask without any emulsion thickness (base coat only) was used to achieve a very thin metallization on the screened product.

The printed blank was covered with an unprinted blank forming essentially a sandwich structure. The structure was laminated substantially as disclosed in Example 1 producing a laminated structure which totally enclosed the pattern. The laminated structure, designated RG1-2, was then fired in air to 1100° C. for one hour under the same schedule as used in Example 1 and resulted in a similar shrinkage as observed for the sample in Example 1, i.e. about a 16% linear shrinkage and a zinc oxide average grain size of about 5–10 microns.

An x-ray photo of a cut section of the sintered composite showed uniformity of metal distribution. Also, each matrix layer was directly bonded to another matrix layer in the area not occupied by metallization.

Metallographic cross-sections of the sintered composite at 100X and 400X magnifications showed the silver as about 2 microns thick and fully dense and continuous but distributed as a mesh like structure. These results show that the silver, on melting during densification of the ceramic, wetted the ceramic sufficiently to remain in place but, due to some shrinkage volume mismatch did not give 100% coverage of the ceramic. However, the silver metallization was directly bonded to the matrix.

This example illustrates that co-fired silver/zinc oxide varistor matrix structures can be produced which are useful in the preparation of multi-layer varistor bodies.

EXAMPLE 3

The procedure used in this example was substantially the same as disclosed in Example 2 except as noted herein.

A screen mask with 1 mil emulsion was utilized in order to increase the thickness of the screen printed metal layer.

The rectangular sheet pattern was printed on the face of 2 blanks which were then placed one on top the other and topped off with an unprinted blank to form a three layer sandwich-type structure wherein the patterns were separated by the thickness of a blank. The patterns were overlapping and disposed in opposite directions.

In the resulting laminated structure, the patterns were totally enclosed. Three such laminated structures were produced.

The resulting sintered composites were designated RG1-3A, 3B and 3C. In the sintered composites, the metallizations were totally enclosed.

X-ray photos of the sintered composite showed that the thicker silver layers resulted in full volume densification of the metallizings and yielded continuous layers with thicknesses about ½ the thickness of the original screen printed metals.

Metallographic cross-sections of samples RG1-3A, 3B and 3C at magnification of 63X and 250X showed that the metallizations were directly bonded to the matrix. The matrix had a porosity of about 10% by volume and there was no porosity detected between the matrix and metallizations.

These sintered composites would be useful in the preparation of multi-layer varistor bodies. For example, part of the matrix could be polished off in a conventional manner to expose a proximal end portion of each metallization sufficiently for electrical contact therewith producing a varistor device.

EXAMPLE 4

The procedure used in this example was substantially the same as disclosed in Example 2 except as noted herein.

One blank was screen printed with ink wherein the metallic particles were comprised of silver, covered with an unprinted blank and laminated (Sample RG1-4A).

A second laminated structure was produced in the same manner except that an ink wherein the metallic particles were comprised of Ag/30 atomic % Pd was used (Sample RG1-4B).

The metallizations were fully enclosed in the resulting sintered composites.

X-ray photos of the sintered composites showed that while the silver metallization was continuous and retained an even distribution throughout the screen printed area, the palladium containing metallization totally segregated into discontinuously small spheres (balled up). It is well known in the art that the simultaneous presence of bismuth (or bismuth oxide) and palladium results in such behavior of silver palladium metallizations in multi-layer capacitor manufacture where a barium or strontium titanate type of ceramic matrix is used. Consequently, palladium containing metallizations would likely not be useful for varistor compositions containing bismuth oxide as a necessary component for their non-linear varistor action.

EXAMPLE 5

The procedure used in this example was substantially as disclosed in Example 3 except as noted herein.

Three blanks were screen printed with ink wherein the metallic particles were comprised of silver, the printed blanks were stacked together and the stack was covered on top and bottom with an unprinted blank forming a 5-layer essentially sandwich-type structure (Sample RG1-5A). In the layered structure, the screen printed materials, i.e. patterns, were spaced from each other by the thickness of a tape. Also, the patterns for forming a first metallization were interleaved with the other two used for forming second metallizations. The first and second metallization-forming materials were disposed at an angle of about 180 degrees to each other.

A second layered structure was produced in the same manner except that four blanks were screen printed with ink wherein the metallic particles were comprised of Ag/30 atomic % Pd and the resulting stack was topped off with an unprinted blank forming a 5-layer sandwich-type structure (Sample RG1-5B).

X-ray photos of the sintered composites showed a small amount of metallization segregation, due to layer delamination, rather than dewetting, occurred in the composite containing silver metallizations. However, in the composite with Pd-containing metallizations, full segregation and spherodization of the metallizations occurred.

This example illustrates the advantage of using silver only as a metallization for ZnO type varistor fabrication which contain minor constituents like bismuth which interact adversely with palladium contents of the inks.

Examples 2–5 are illustrated in Table I.

um/gallium alloy. Sequentially increasing voltages were then applied from a Sorensen dc power supply and the currents through the sample measured. FIG. 5 shows a graph of the voltage/current values obtained. It is evident from this graph that the voltage/current relationship was non-ohmic and highly non-linear as is the desired case for a varistor device and the turn-on voltage (i.e. that voltage at which the device abruptly changes from ohmic to non-ohmic behaviour) was about 80 volts. From Equation 1, the alpha value (i.e. the slope on a log/log basis of the non-linear portion of the curve) calculated to be about 35. This alpha value, which is a measure of the performance of a varistor, is fully consistent with the corresponding values for commercial, ZnO varistor devices. Polished sections of the RG1-3A sample showed that the ZnO grain size was approximately 5 microns and thus the volts per grain at turn-on voltage was about 2.3 volts/grain, which is a value approximately corresponding to commercial devices of generally larger grain size (i.e. about 1.5 volts/-grain). The above data shows that the co-fired, pure silver metallized, RG1-3A multi-layer sample exhibited varistor characteristics fully consistent with commercially available ZnO devices which are not multi-layered and which require metallizations by processes which are subsequent to firing of the ceramic.

What is claimed is:

1. A composite useful for forming a varistor device comprised of a multi-layer varistor matrix containing a plurality of continuous metallizations comprised of at least a first and second metallization, said varistor matrix being comprised of at least three layers with a portion of each matrix layer being directly bonded to another matrix layer, said matrix totally surrounding and being directly bonded to each metallization, said metallizations being separated from each other by at least substantially a layer of matrix, each said metallization being present at substantially a region between two layers of matrix, said first and second metallizations being offset from each other, at least one of said first and second metallizations being overlapping, said varistor matrix being comprised of zinc oxide grains isolated from each other by continuous amorphous glassy phase, said metallizations being comprised of element silver, said composite having a porosity of less than about 10%.

TABLE I

| Ex. | Sample # (# tape layers) | Metallization-Forming Composition | Screen Emulsion Thickness | Fired Metallization Thickness (microns) | No. Layers with Metallization | Metallization Continuity | Metallization Uniformity |
|---|---|---|---|---|---|---|---|
| 2 | RG1-2 (2) | .999 Ag | none (base ct.) | 2 | 1 | total | uniform |
| 3 | RG1-3A (3) | .999 Ag | 1 mil | 8 | 2 | total | slightly variable |
| | RG1-3B (3) | .999 Ag | 1 mil | 8 | 2 | total | slightly variable |
| | RG1-3C (3) | .999 Ag | 1 mil | 8–12 | 2 | total | slightly variable |
| 4 | RG1-4A (2) | .999 Ag | none (base ct.) | 2 | 1 | total | uniform |
| | RG1-4B (2) | Ag/30 at. % Pd | none (base ct.) | layer absent | (1) | discon-tinuous | balled up |
| 5 | RG1-5A (5) | .999 Ag | 1 mil | 8–15 | 3 | contin-uous | partial delamin-ation |
| | RG1-5B | Ag/30 at. % Pd | 1 mil | layers absent | (4) | discont-inuous | balled up |

EXAMPLE 6

End sections were ground from Sample RG1-3A to expose only the proximal end portion of each metallization and leaving a section of overlap of the metallizations of about 1.5 centimeters internally in the sample with a metallization separation equal to the middle matrix layer which had a thickness of about 140 microns. The area of overlap of the metallizations was about 0.6 square cms. After mounting the sample on a Leucite plastic board, electrical contact to each exposed end portion of each metallization, i.e. electrode in this sample, was made with gold foil wetted with liquid indi- 2. The composite according to claim 1 wherein each said metallization is substantially in the form of a sheet, wherein there are a plurality of first and second metallizations and wherein each first metallization overlaps with each second metallization.

3. A varistor device comprised of a varistor matrix containing a first and second metallization, said varistor matrix being comprised of at least three layers with a portion of each matrix layer being directly bonded to another matrix layer, said first and second metallizations being spaced from each other by at least substantially a layer of matrix, each said metallization being present at substantially the region between two layers of matrix and being in direct contact with said matrix, each said metallization having a proximal end portion and a distal end portion wherein the proximal end portion is closest to the edge of the matrix and opposite the distal end portion which is farthest away from the edge of the matrix, each said metallization having only its proximal end portion exposed, said first and second metallizations being overlapping and offset from each other, each said metallization being continuous and being comprised of an elemental silver, said varistor matrix being comprised of zinc oxide grains isolated from each other by continuous amorphous glassy phase, said varistor device having a porosity of less than about 10%.

4. The varistor device according to claim 3 wherein each said metallization is substantially in the form of a sheet.

5. A varistor device comprised of a varistor matrix containing a plurality of first and second metallizations, said varistor matrix being comprised of more than three layers with a portion of each matrix layer being directly bonded to another matrix layer, said metallizations being spaced from each other by at least substantially a layer of matrix and being in direct contact with said matrix, each said metallization being present at substantially the region between two layers of matrix, each said metallization having a proximal end portion and a distal end portion wherein the proximal end portion is closest to the edge of the matrix and opposite the distal end portion which is farthest away from the edge of the matrix, each said metallization being totally surrounded by said matrix except for its proximal end portion, each said first metallization having its proximal end portion electrically connected to form a first electrode, each said second metallization having its proximal end portion electrically connected to form a second electrode, said first and second metallizations being offset from each other, at least a pair of said spaced first and second metallizations being overlapping, each said metallization being continuous and being comprised of elemental silver, said varistor matrix being comprised of zinc oxide grains isolated from each other by continuous amorphous glassy phase, said varistor device having a porosity of less than about 10%.

6. The varistor device according to claim 5 wherein each said metallization is substantially in the form of a sheet and wherein each said first metallization overlaps with each said second metallization.

7. The varistor device according to claim 5 wherein each said first metallization is disposed at about a right angle to each said second metallization.

8. The varistor device according to claim 5 wherein each said first metallization is disposed at an angle of about 180° C. to each said second metallization.

9. A process for producing a sintered multi-layer composite having a porosity of less than about 10% by volume of the composite, said composite being comprised of at least a three-layer varistor matrix of zinc oxide grains isolated from each other by continuous amorphous glassy phase wherein said matrix totally surrounds each of at least a first and second silver metallization, each said metallization having a proximal end portion and a distal end portion wherein the proximal end portion is closest to the edge of the matrix and opposite the distal end portion which is farthest away from the edge of the matrix, said metallizations being continuous, spaced from each other and having a configuration enabling said composite to be useful for forming a varistor device, which comprises:

(a) providing a varistor-forming powder comprised of a mixture of zinc oxide and glassy phase-forming additive;

(b) admixing said varistor-forming powder with an organic binding material;

(c) forming the resulting mixture into tape;

(d) providing a silver metallization-forming material;

(e) forming a layered structure of at least three of said tapes containing said metallization-forming material therewithin between said layers, said metallization-forming material being present in a configuration and amount sufficient to produce said metallizations;

(f) laminating the layered structure producing a laminated layered structure wherein none of said metallization-forming material is exposed;

(g) firing said laminated structure to thermally decompose its organic component at an elevated temperature below about 600° C. leaving no significant deleterious residue in the resulting fired structure, said firing being carried out in an atmosphere or vacuum which has no significant deleterious effect on said composite;

(h) sintering the resulting fired structure at a temperature ranging from about 1000° C. to about 1400° C. in an oxygen-containing atmosphere to produce a sintered product having the composition of said composite, said fired structure having a sufficient open volume available to accommodate said silver during sintering; and (i) cooling said sintered product to produce said composite, said sintering and cooling being carried out in an atmosphere which has no significant deleterious effect on said composite.

10. The process according to claim 9 wherein said sintering temperature ranges from about 1100° C. to about 1300° C.

11. The process according to claim 9 which is carried out in air.

12. The process according to claim 9 wherein said metallization-forming material is comprised of particulates of silver.

13. The process according to claim 9 wherein said metallization-forming material is comprised of a solid body of elemental silver.

14. The process according to claim 9 wherein each said metallization-forming material in said layered structure is substantially in the shape of a sheet.

15. The process according to claim 9 wherein said sintered composite contains a plurality of first and second metallizations, wherein each said metallization is substantially in the shape of a sheet, and wherein each said first metallization overlaps each said second metallization and is offset therefrom.

16. The process according to claim 9 wherein said metallizations in said sintered composite are comprised of a first and second metallization and wherein part of said matrix is removed to expose the proximal end portion of said first and second metallizations thereby producing a varistor device.

17. The process according to claim 9 wherein said metallizations in said sintered composite are comprised of a plurality of first and second metallizations, wherein part of said matrix is removed to expose the proximal end portion of each of said first and second metallizations, wherein said exposed proximal end portions of said first metallizations are electrically connected thereby producing a first electrode and wherein said exposed proximal end portions of said second metallizations are electrically connected thereby producing a second electrode.

18. The process according to claim 9 wherein said metallizations in said sintered composite are comprised of a plurality of first metallizations and a single second metallization, wherein part of said matrix is removed to expose the proximal end portion of each of said metallizations and wherein said exposed proximal end portions of said first metallizations are electrically connected thereby producing a varistor device.

* * * * *